M. SMITH.
SOCKET FOR SCYTHE-SHANK.

No. 186,218.         Patented Jan. 16, 1877.

WITNESSES:
A. W. Almqvist
J. H. Scarborough

INVENTOR:
Miles Smith
BY Munn & Co.
ATTORNEYS.

UNITED STATES PATENT OFFICE.

MILES SMITH, OF SPRINGFIELD, VERMONT.

IMPROVEMENT IN SOCKETS FOR SCYTHE-SHANKS.

Specification forming part of Letters Patent No. 186,218, dated January 16, 1877; application filed October 30, 1876.

Figure 1:
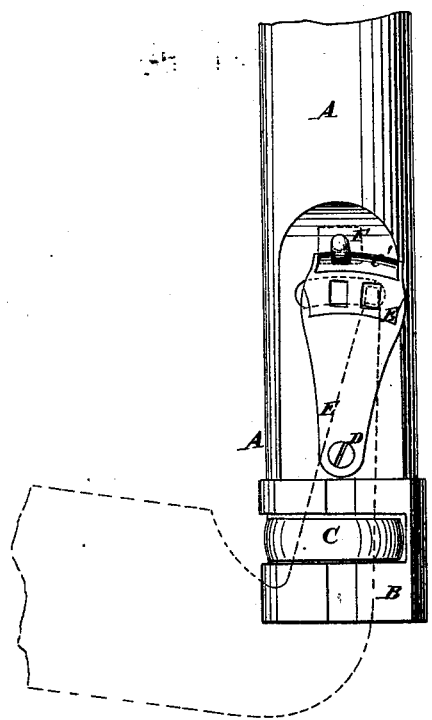
Figure 2:
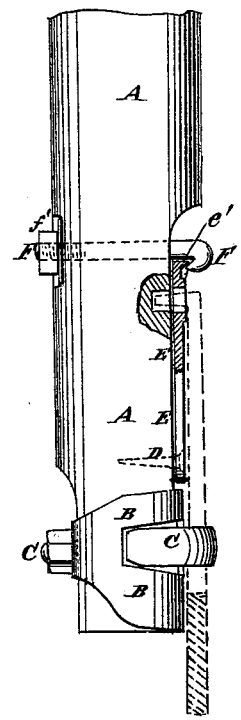

To all whom it may concern:

Be it known that I, MILES SMITH, of Springfield, in the county of Windsor and State of Vermont, have invented a new and useful Improvement in Adjustable Socket for Scythe-Shank Tangs, of which the following is a specification:

Figure 1 is a view of the under side of the lower end of a scythe-snath to which my improvement has been applied. Fig. 2 is a view of the forward side of the same, part being broken away to show the construction.

Similar letters of reference indicate corresponding parts.

The object of this invention is to furnish an improved device for connecting a scythe with a snath, in such a way that the point of the scythe may be set in or out to hang it, as the wishes of the mower may require, and which shall be simple in construction, conveniently adjusted, and will hold the scythe firmly.

A represents the lower part of a scythe-snath, upon the lower end of which is secured the ring B and the loop-bolt C, in the usual way. To the lower side of the lower part of the snath A is pivoted, by a screw, rivet, or bolt, D, the narrow end of the plate E. In the upper and wider end of the plate E are formed one or more holes or sockets, to receive the tang of the scythe-shank. Upon the side of the upper end of the socket-plate E is formed a rib, $e'$, either by recessing or grooving the said upper side, or by projecting the edge of the said end. F is a hook-bolt, which passes through a hole in the snath A, and the hook of which hooks over the said rib $e'$. The hook-bolt F is drawn tight, clamping the end of the socket-plate E securely to the snath A by a nut, $f'$, as shown in Fig. 2.

By this construction, by loosening the nut $f'$ of the hook F, the upper end of the socket-plate E may be adjusted to hang the scythe in or out, as desired.

By this construction, also, when the scythe has once been properly hung, it may be detached for grinding, or for any other purpose, and again attached, without changing its hang.

Having thus described my invention, I claim as new and desire to secure by Letters Patent—

The combination of the pivoted vibrating plate E, having the rib $e'$ at its free end, and the hooked retaining-bolt F, with the snath, scythe, and ordinary clamping device at the end of the snath, as and for the purpose set forth.

MILES SMITH.

Witnesses:
F. P. BALL,
HENRY CLOSSON.